United States Patent [19]
Barton

[11] 4,107,686
[45] Aug. 15, 1978

[54] SCANNING BEAM RECEIVER SYSTEM WITH COHERENT POST-DETECTION SIGNAL PROCESSING

[75] Inventor: Paul Barton, Stortford, England

[73] Assignee: International Standard Electric Corporation, New York, N.Y.

[21] Appl. No.: 762,259

[22] Filed: Jan. 25, 1977

[30] Foreign Application Priority Data

Jan. 29, 1976 [GB] United Kingdom ............... 3507/76

[51] Int. Cl.² .................................................. G01S 1/44
[52] U.S. Cl. ............................. 343/106 R; 343/108 M
[58] Field of Search ...................... 343/106 R, 108 M

[56] References Cited
U.S. PATENT DOCUMENTS

| | | | |
|---|---|---|---|
| 3,141,166 | 7/1964 | Strong et al. | 343/106 R |
| 4,053,892 | 10/1977 | Earp | 343/106 R |

Primary Examiner—Maynard R. Wilbur
Assistant Examiner—Richard E. Berger
Attorney, Agent, or Firm—William T. O'Neil

[57] ABSTRACT

A receiving system for a time-reference, scanning beam radio guidance system in which the scanning beam, an offset frequency reference signal and a time reference signal are provided from the ground beacon location. The receiving system includes a first detector responsive to the scanning beam and offset reference signals to provide a spectrum centered about the offset signal. A bandpass filter with sloping skirts on both sides of the center (offset) frequency provides tapering, with decreasing amplitude response on each side of the center frequency, the width of the spectrum being a function of the aperture of the beam transmitting antenna at the ground beacon. Angular information is determined by thresholding the beam signal to find two points on either side of beam center, averaging these times and comparing with the time-reference signal to air-derive angular navigational data, especially for aircraft landing approach systems.

8 Claims, 7 Drawing Figures

SCANNING BEAM RECEIVER SYSTEM WITH COHERENT POST-DETECTION SIGNAL PROCESSING

BACKGROUND OF THE INVENTION

1. Field of the Invention

The invention relates generally to radio navigation and more particularly to air-derived guidance systems responsive to a ground based scanning beam transmission format.

2. Description of the Prior Art

Systems are known which air-derive positional information from transmitted ground signals discretely coded in angle by one means or another. Broadly speaking, the well known VOR fits that description. Another system particularly adapted to aircraft landing approach navigation is described in U.S. Pat. No. 3,159,837. U.S. Pat. No. 3,141,166 describes a system in which the angle information in a scanning beam navigational approach beacon is basically time referenced, and it is to this basic type of system that the present invention is most germane.

More recently, a system which transmits a single frequency collimated beam sweeping (scanning) a sector of space and a separate signal of offset frequency directed to illuminate the entire swept sector independently of the scan is described in U.S. patent application Ser. No. 662,342 filed Mar. 1, 1976, now U.S. Pat. No. 4,053,892, and assigned to the assignee of this application. The separate signal of offset frequency is a phase reference in that system, enabling coherent signal processing in the air of a type which was previously known only in two-way systems, such as the familiar coherent MTI radar.

The provision of such a reference signal permits the beat between the two signals (beam and reference) to be detected in the receiver to produce a signal of average frequency which is that of the reference signal. The instantaneous phase of the beat signal at any point in time depends on the phase relationship between the reference signal and the beam signal, and a detected signal which is of a coherent nature is thereby provided. The manner in which the present invention improves on this art will be evident as this description proceeds.

SUMMARY

The general object of the present invention may be said to be employment of the coherence (aforementioned) in post-detection signal processing in the receiver to improve accuracy and overall performance.

According to the invention there is provided a receiver system for a radio guidance scanning beam system of the type wherein there is transmitted a single frequency collimated beam signal sweeping the sector and, either there is transmitted continuously over the whole of the sector or there is transmitted with the beam, a reference signal of a frequency offset from the beam frequency, said receiver system having first detector means responsive to the beam signal and the reference signal to produce an output signal having a center frequency which is that of the reference signal and a spectral width which is a function of the aperture of the beam transmitting antenna, means for amplitude tapering the output signal on either side of that center frequency to effect maximum reduction of amplitude at the upper and lower frequencies defining the spectral width, second detector means for the resulting tapered signal, and means responsive to the output of this second detector to establish the relative position of the beam with respect to a time reference.

The invention will be better understood from the following description in conjunction with the accompanying drawings.

DESCRIPTION OF THE PREFERRED EMBODIMENT

Figure 1:
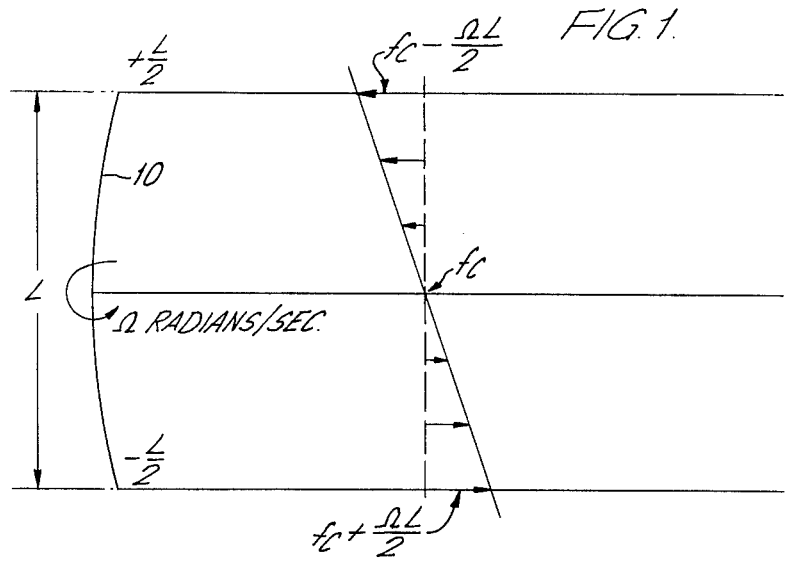
FIG. 1 is a schematic functional representation of a scanning beam transmitting antenna in operation.

FIG. 1 shows the outline of a mechanically rotated dish antenna 10 of transmitting aperture L wavelengths (at the beam frequency $f_c$), adapted scanning over its service sector at an angular velocity of $\Omega$ radians/sec. A dish antenna has been shown for convenience, but it will be understood that the collimated beam signal could equally well be transmitted by a phased array antenna of well-known type, wherein there is electronic "rotation" of the antenna which is strictly analogous to the mechanically rotated dish.

Assuming the direction of rotation, i.e., the direction of scan, is counter-clockwise as shown, there are positive Doppler shifts in the beam frequency on the advancing radius from the center of the aperture, and negative Doppler shifts on the receding radius. The absolute values of these Doppler shifts are directly proportional to the distance of the transmitting point of the antenna from aperture center.

Figure 2:
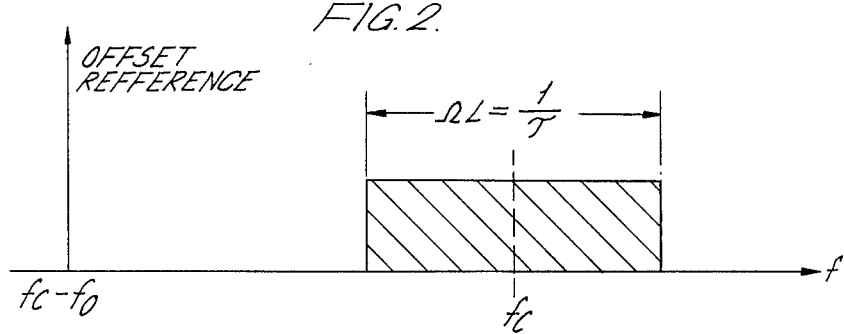
FIG. 2 shows the frequency spectra of the received beam signal, and an offset reference signal.

With a beam shape of $\sin x/x$ in form, the beam signal as received at a receiver in the sector has a rectangular frequency spectrum (shown in FIG. 2) of total width $\Omega L = 1/\tau$, where $\tau$ is the "dwell time" of the beam. Any point across that spectrum corresponds directly with a point across the array aperture. Also received, or generated, at the receiver, is an offset frequency $f_c - f_o$.

Typically, the dwell times (in angular terms) for a scanning beam system are of the order of 100 to 1,000 $\mu$sec. Taking 200 $\mu$sec., as a typical example, the spectral width of the scanned beam signal is found to be 5 kHz. To avoid harmonic problems in this situation, the offset of the reference signal should exceed 7.5 kHz, at least. Further, there is practical convenience in having many cycles inside the main beam to assist final detection and timing of the beam (to be described later), so that for the case being considered, an offset frequency $f_o$ of 20 kHz is a convenient choice.

Figure 3:
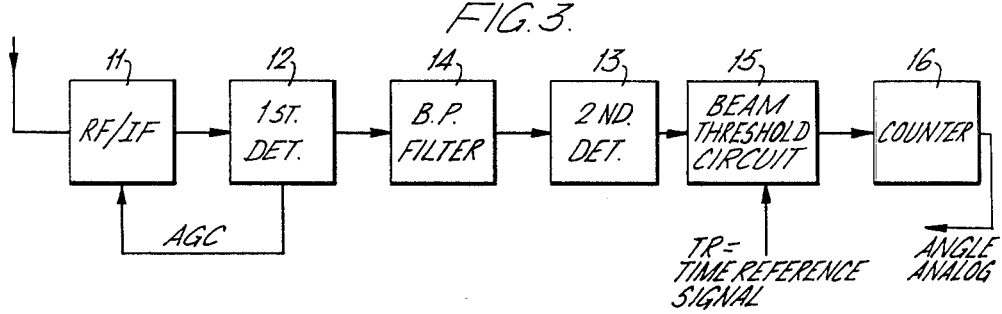
FIG. 3 shows typical stages of a receiver embodying the invention.

FIG. 3 shows receiver stages for processing the received beam signal and the reference signal, the reference signal in this instance being assumed to be transmitted with the beam.

The receiver is comprised of RF and IF stages 11, which are linear, and AGC is provided in the known way from a first detector 12, the AGC time constants exceeding the sector scan time. Between first detector 12 and second detector 13, there is a bandpass filter 14 centered on $f_o$.

The first detector 12 operates on the IF components from 11 to yield the sub-carrier signal centered at $f_o$.

Figure 4A:
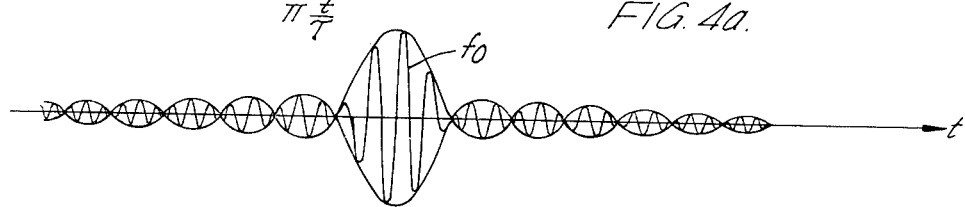
FIGS. 4 to 6 show signal waveforms and frequency spectra at different stages of the receiver.
Figure 4B:
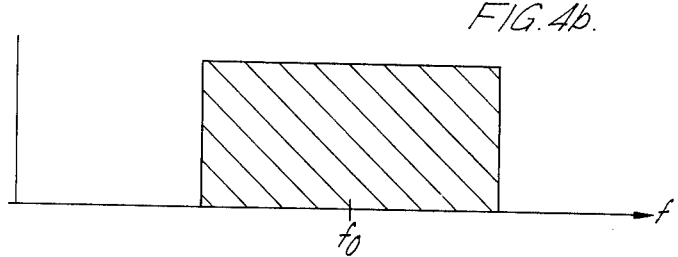

FIGS. 4a and 4b show the beat waveform and the beat spectrum, respectively.

Figure 5:
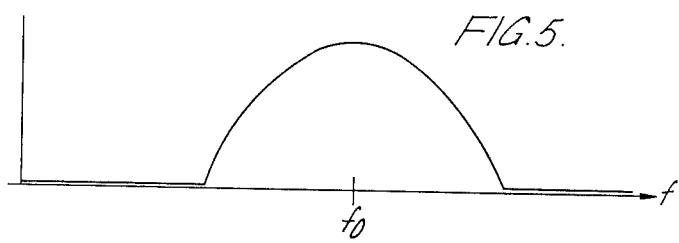

The first detected signal from 12 is applied to the filter 14 which has a total bandwidth of 2.5 kHz. That filter characteristic is shown in FIG. 5, centered at $f_o$ with a frequency response $H(f - f_o)$, and effectively tapers the contributions of different array points according to its response characteristic. Assuming no phase distortion in the filter, then the contributions are amplitude-tapered only, from zero in the middle to −7 dB at the outside.

Figure 6:
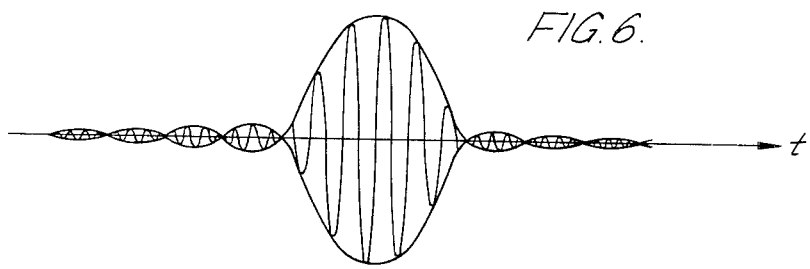

FIG. 5 shows an idealized case where the filter has a response given by $H(f - f_o) = \cos \pi \tau (f - f_o)$, for which the filtered time signal $V(t)$, FIG. 6, exhibits a main beam and sidelobe structure commensurate with the taper applied, i.e., $$V(t) = \left[ \frac{\sin \pi (t - \frac{\tau}{2})}{\pi (t - \frac{\tau}{2})} + \frac{\sin \pi (t + \frac{\tau}{2})}{(t + \frac{\tau}{2})} \right] \cos 2\pi f_o t$$

The filter output is applied to the second detector 13, whose output is an exact representation of the beam power as a function of time, without any influence from the sub-carrier oscillation. It is adequate in many circumstances to provide simple envelope detection at this point.

The timing of the beam center from the output from the second detector 13 is conventionally determined in stage 15, by interpolation between two threshold points. This operation involves averaging the time between the two beam cross-overs at an arbitrary level below the level of beam "boresite." The output of 15 then comprises two markers — one for this averaged time representing beam center, and the other representing the externally provided time reference TR. Counter 16 can then make a time measurement between TR and beam center, the output of 16 then being an angle analog signal which was to be derived.

Operating in the frequency domain for a scanned beam permits operation on multiple signals (including their sidelobes) in a linear fashion. In contrast, the appropriate time-modulation of a singly received scanned beam shape would also produce a signal with apparently low sidelobes, however, the combination of two or more such signals representing different angles presents the impossible requirement of multiplying the resultant signal by different quantities at the same time.

It is to be understood that the foregoing description of a specific embodiment of this invention is made by way of example only and is not to be considered as a limitation on its scope.

What is claimed is:

1. In a time-reference scanning beam receiving system, radio navigation apparatus for generating air-derived angular information, responsive to ground-based means for transmitting a radio frequency beam scanned through a sector of space and including means for providing a time-reference signal related to said beam scan, said ground-based means also including means for provision of an offset-frequency reference signal through one of a plurality of arrangements at least including continuous illumination of said scanned sector and generation of said reference within said receiving system, comprising:

first detector means responsive to signals of said scanned beam and said offset-frequency reference to produce a first detector output centered about the frequency of said offset reference and having a spectral width which is a function of the aperture of the antenna transmitting said scanned beam;

first means responsive to said first detector output for effecting a predetermined amplitude taper on each side of said center frequency such that frequencies are increasingly attenuated as their spacing from said center frequency increases;

second detector means for demodulating the output of said tapering means;

and second means responsive to said time-reference signal and to said second detector means to establish the relative position of said beam with respect to said time-reference signal to provide said angular information.

2. Apparatus according to claim 1 in which said first means is a band-pass filter having a center frequency equal to the frequency of said offset signal within the output of said first detector means, and having sloping amplitude transmission characteristics on each side of said center frequency.

3. Apparatus according to claim 1 in which said second detector means is an envelope detector 4. Apparatus according to claim 1 in which said second means comprises means for determining the received beam center by interpolation between cross-over points on either side of the center of said beam and also means for comparing said beam center with said time-reference signal to provide said angular information.

5. Apparatus according to claim 1 in which, for minimization of harmonic interference, said offset frequency reference signal has a frequency removed from the frequency by at least (1.5) (1/τ), where τ is the dwell time of the scanning beam during which it is received by said receiving system.

6. Apparatus according to claim 2 in which said second means comprises means for determining the received beam center by interpolation between cross-over points on either side of the center of said beam and also means for comparing said beam center with said time-reference signal to provide said angular information.

7. Apparatus according to claim 2 in which, for minimization of harmonic interference, said offset frequency reference signal has a frequency removed from the frequency by at least (1.5) (1/τ), where τ is the dwell time of the scanning beam during which it is received by said receiving system.

8. Apparatus according to claim 4 in which, for minimization of harmonic interference, said offset frequency reference signal has a frequency removed from the frequency by at least (1.5) (1/τ), where τ is the dwell time of the scanning beam during which it is received by said receiving system.

* * * * *